(12) United States Patent
Sobue et al.

(10) Patent No.: US 8,713,700 B2
(45) Date of Patent: Apr. 29, 2014

(54) ACCESS CONTROL METHOD, INFORMATION DISPLAY DEVICE USING THE SAME, AND INFORMATION DISPLAY SYSTEM

(75) Inventors: Tsuneo Sobue, Tokyo (JP); Tatsuaki Osafune, Kawasaki (JP)

(73) Assignee: Hitachi Automotive Sytstems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/541,071

(22) Filed: Jul. 3, 2012

(65) Prior Publication Data

US 2013/0083919 A1 Apr. 4, 2013

(30) Foreign Application Priority Data

Oct. 3, 2011 (JP) ................. 2011-218854

(51) Int. Cl.
*H04L 9/32* (2006.01)
*G06F 21/12* (2013.01)
*G06F 21/62* (2013.01)

(52) U.S. Cl.
CPC ............. *G06F 21/123* (2013.01); *G06F 21/62* (2013.01); *G06F 2211/007* (2013.01); *G06F 2221/2111* (2013.01)
USPC ................. 726/27; 726/28; 380/44; 380/232; 380/258; 701/408; 701/409; 701/410; 701/411; 701/412; 701/526

(58) Field of Classification Search
CPC . G06F 21/123; G06F 21/62; G06F 2211/007; G06F 2221/2111
USPC ............ 726/17, 28, 29, 27; 380/44, 232, 258, 380/412; 701/408, 409, 410, 411, 526
See application file for complete search history.

(56) References Cited

U.S. PATENT DOCUMENTS

| | | | |
|---|---|---|---|
| 7,401,229 B2 | 7/2008 | Ishidoshiro | |
| 2008/0048850 A1* | 2/2008 | Yamada | ........................ 340/439 |
| 2012/0060008 A1* | 3/2012 | Matsushima et al. | ......... 711/163 |

FOREIGN PATENT DOCUMENTS

JP 2011-118635 A 6/2011

\* cited by examiner

*Primary Examiner* — Jung Kim
*Assistant Examiner* — Ayoub Alata
(74) *Attorney, Agent, or Firm* — Volpe and Koenig, P.C.

(57) ABSTRACT

When a user carries a mobile terminal with confidential information, such as customer information, stored therein, it is required to maintain information confidentiality and to prevent an unauthorized third party from accessing the confidential information even if the mobile terminal is stolen. According to the disclosed access control method, an encryption key is generated based on a planned route and the information is encrypted. When the user accesses the information, a decryption key is generated based on the actual movement route that is regularly acquired. The encrypted information can be decrypted if the planned route and the movement route match.

6 Claims, 12 Drawing Sheets

FIG. 3

| USER ID | DATE | ORDER | ORIGIN | DESTINATION | ROAD LINK |
|---|---|---|---|---|---|
| 1 | 2011/7/19 | 1 | P1 | P2 | L11,L12,L13,... |
| 1 | 2011/7/19 | 2 | P2 | P3 | L21,L22,L23,... |
| 1 | ... | ... | ... | ... | ... |
| 1 | 2011/7/18 | 10 | P10 | P11 | L101,L102,... |
| ... | | | | | ... |

| DESTINATION | CUSTOMER INF FILE |
|---|---|
| P2 | C:/data/info1.data |
| P3 | C:/data/info2.data |
| ... | ... |

401 — DESTINATION
402 — CUSTOMER INF FILE

| DATE/TIME | COORDINATE | ROAD LINK | DESTINATION ARRIVAL FLAG |
|---|---|---|---|
| 2011/7/18 14:26:30 | X1,Y1 | L11 | 1 |
| 2011/7/18 14:26:29 | X2,Y2 | L11 | 0 |
| ... | ... | ... | ... |

501 — DATE/TIME
502 — COORDINATE
503 — ROAD LINK
504 — DESTINATION ARRIVAL FLAG

| PARTIAL AREA ID | PARTIAL AREA |
|---|---|
| M1 | (X1,Y1)−(X2,Y2) |
| M2 | (X2,Y1)−(X3,Y2) |
| ... | ... |

601 — PARTIAL AREA ID
602 — PARTIAL AREA

| BEFORE-MOVEMENT PARTIAL AREA ID | AFTER-MOVEMENT PARTIAL AREA ID |
|---|---|
| M1 | M2 |
| M1 | M3 |
| ... | ... |

701 — BEFORE-MOVEMENT PARTIAL AREA ID
702 — AFTER-MOVEMENT PARTIAL AREA ID

US 8,713,700 B2

ACCESS CONTROL METHOD, INFORMATION DISPLAY DEVICE USING THE SAME, AND INFORMATION DISPLAY SYSTEM

INCORPORATION BY REFERENCE

This application claims priority based on a Japanese patent application, No. 2011-218854 filed on Oct. 3, 2011, the entire contents of which are incorporated herein by reference.

BACKGROUND

The disclosed subject relates to an access control method for controlling the permission of information display, an information display device using the method, and an information display system.

Information confidentiality must be maintained when we carry a mobile terminal with confidential information, such as customer information, stored therein. Maintaining confidentiality is to establish the state in which only those authorized to access information are allowed to access the information. This means that, if the mobile terminal is stolen, some means is required to prevent a third party from browsing the confidential information. One of the methods for preventing a third party from browsing confidential information is to authenticate a person who accesses the information for browsing.

One of the authentication methods is to authenticate a person using a pre-defined character string information (password, access code, etc.,). An example of such a method is disclosed in U.S. Pat. No. 7,401,229. According to the method, an encrypted access code is stored in a transportable and nonvolatile memory. When a user actually carries the nonvolatile memory to plug it into a computer remotely accessing, remote access is established between the computer to be remotely accessed and the computer remotely accessing.

Another authentication method is a method that uses position information for authentication. An example is disclosed in paragraph 0007 in JP-A-2011-118635. According to this method, security is provided using position information (e.g., a place fixed for meeting or a place fixed for arrangement), directly related to a person, as a key (authentication condition).

SUMMARY

The method disclosed in U.S. Pat. No. 7,401,229, in which an encrypted access code stored in a nonvolatile memory is used for authentication, requires that an external device, a nonvolatile memory in this case, be coupled. The problem with this method is that the coupling of an external device to a mobile terminal leads to an increase in the cost and that the need to couple an external device each time the user browses customer information is cumbersome.

The problem with the authentication method using position information, such as the one disclosed in JP-A-2011-118635, is that the method depends largely on the validity of position information but the position information is easily forged. For example, when the position information (latitude, longitude) is identified using a radio wave from a satellite positioning system such as GPS, the position information may be forged by transmitting a forged radio wave. Another forging method is to replace the software, which calculates position information based on a received radio wave, with counterfeit software, resulting in a situation that the user unknowingly uses forged position information.

In view of the foregoing, there is a need for a secure, easy-to-use authentication method.

For use on an information display device, such as a mobile terminal, that accesses (for example, browses) confidential information (for example, customer information) during movement, this specification discloses an access control method for controlling access permission based on the movement route of the terminal position, an information display device that uses the method, and an information display system.

The disclosed access control method, information display device that uses the method, and information display system are characterized as follows. An encryption key is generated on a management terminal based on a planned route, and information is encrypted using the encryption key. When the user accesses the information via the information display device, a decryption key is generated based on the actual movement route (actual route) that is regularly acquired, and the encrypted information is decrypted using the decryption key. That is, the encrypted information can be decrypted if the planned route and the actual route match.

For example, one specific mode that is disclosed is an access control method for accessing information at a place, to which a user will move, using a portable information display device, the access control method comprising the steps of:

identifying identifiers of planned waypoints during a move to a destination and an identifier of the destination, the destination being a place where the information will be accessed;

creating a planned route of the information display device, the planned route represented as a sequence of the identifiers of the planned waypoints and the identifier of the destination;

generating an encryption key based on the created planned route;

encrypting the information, which will be accessed, using the generated encryption key;

repeatedly acquiring position information on the information display device during the move;

identifying identifiers of waypoints and an identifier of a current position based on the acquired position information;

identifying an actual route of the information display device, the actual route represented by a sequence of the identifiers of the waypoints and the identifier of the destination;

generating a decryption key based on the identified actual route; and decrypting the encrypted information using the generated decryption key and, if the decryption is successful, permitting the information display device to access the information.

In another preferable mode that is disclosed, a partial-area-based actual route is used as the actual route.

In still another preferable mode that is disclosed, an actual route using a partial area, corresponding to one or more of a origin, a destination, and intersections on the route from the origin to the destination, is used.

In still another preferable mode that is disclosed, a road-link-based actual route is used as the actual route.

In still another preferable mode that is disclosed, a partial route that loops is deleted from the actual route for correcting the actual route and, after that, the decryption key is generated.

The disclosure allows the user to take out information while maintaining information confidentiality.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram showing an example of the table configuration of a route information management unit in this embodiment.

FIG. 4 is a diagram showing an example of the table configuration of a customer information management unit in this embodiment.

FIG. 5 is a diagram showing an example of the table configuration of a position information history management unit in this embodiment.

FIG. 6 is a diagram showing an example of the table configuration of a partial area information management unit in this embodiment.

FIG. 7 is a diagram showing an example of the table configuration of a warning information management unit in this embodiment.

DETAILED DESCRIPTION OF THE EMBODIMENTS

An embodiment of the present invention will be described in detail with reference to the drawings. In the description of the embodiment below, customer information is used as an example of confidential information and browsing is assumed as an example of access.

Figure 1:
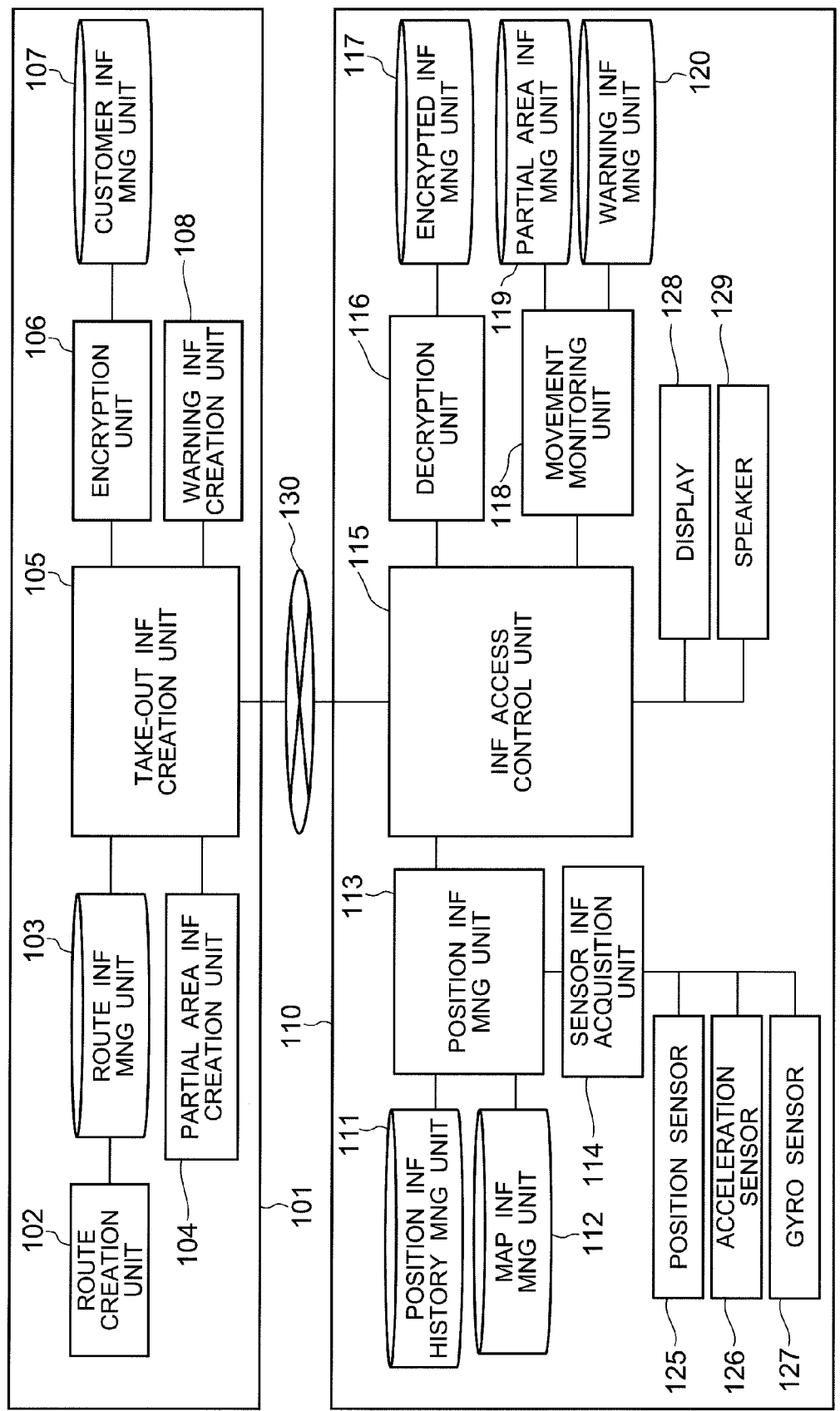
FIG. 1 is a diagram showing an example of the system configuration in this embodiment.

FIG. 1 is a diagram showing the configuration of a system in this embodiment. This system includes a management terminal 101 and an information display device 110. The management terminal 101 and the information display device 110 are coupled over a network 130 for transmitting and receiving information. The network 130 may be a wired link or a radio link.

The management terminal 101 includes the following functional units: route creation unit 102, route information (inf) management (mng) unit 103, partial area information creation unit 104, take-out information creation unit 105, encryption unit 106, customer information management unit 107, and warning information creation unit 108. These processing units and the processing described below are implemented by executing the programs on the CPU included in the management terminal 101.

The route creation unit 102 creates a planned route, along which to travel, based on the interaction processing with the user, and records the created planned route in the route information management unit 103. In this case, multiple routes from the origin to the destination may be registered. For example, when two routes from the origin to the destination are registered, the customer information may be browsed via any one of the routes.

The route information management unit 103 stores not only a route, along which to travel, that is created by the route creation unit 102 but also a route with a past date. For the information on a past route, the route information management unit 103 collects the movement result from a position information history management unit 111 in the information display device 110 and, if the user traveled along a route different from the planned route, updates the information in the route information management unit 103 with the movement result.

The partial area information creation unit 104 creates partial area information based on a route registered in the route information management unit 103, and the take-out information creation unit 105 creates a planned route using the registered route and the partial area information. The encryption unit 106 encrypts the customer information using an encryption key created based on the planned route, and the warning information creation unit 108 creates warning information based on the planned route. If multiple routes are registered for the same origin and the destination, a planned route is created for each route. If multiple planned routes are created, the encryption unit 106 encrypts the customer information using different encryption keys, once for each planned route.

The information display device 110 includes the following functional units: position information history management unit 111, map information management unit 112, position information management unit 113, sensor information acquisition unit 114, information access control unit 115, decryption unit 116, encrypted information management unit 117, movement monitoring unit 118, partial area information management unit 119, and warning information management unit 120. These processing units and the processing described below are implemented by executing the programs on the CPU included in the information display device 110.

The position information management unit 113 regularly acquires the sensor information from a position information sensor 125, an acceleration sensor 126, and a gyro sensor 127 via the sensor information acquisition unit 114, wherein the position sensor 125 receives a radio wave from a satellite positioning system, such as GPS, for identifying the position. The position information management unit 113 identifies the current position on the map using the map information, managed by the map information management unit 112, and the acquired sensor information and then registers the current position in the position information history management unit 111. The position information history management unit 111 stores not only today's position information history but also past position information including yesterday's information. The upper limit of data that can be stored is pre-defined and, when the amount of the position information history reaches a predetermined amount, the position information history management unit 111 deletes the information beginning with the oldest information. The upper limit may be fixed or variable. The upper limit may be set using an absolute value (for example, 100 MB), a relative value for the capacity of the storage device (for example, 30%), or an absolute value for the remaining amount of the storage device (for example, history may be stored until the remaining amount becomes 500 MB).

The movement monitoring unit 118 regularly acquires the current position from the position information management unit 113 and, as the current position moves, determines if the user moves to a different partial area or if a warning is required for the user. The information access control unit 115 manages the movement history as an actual route, and the decryption unit 116 decrypts the customer information based on the actual route.

The user creates a route using the management terminal 101 in the office. Next, the user downloads the partial area information created based on the created route, encrypted customer information, and warning information into the information display device 110 via the network 130. The downloaded partial area information is saved in the partial area information management unit 119, the encrypted customer information is saved in the encrypted information management unit 117, and the warning information is saved in the warning information management unit 120. After downloading the information, the user rides in a car with the information display device 110, sets it in the car, and starts traveling.

Figure 2:
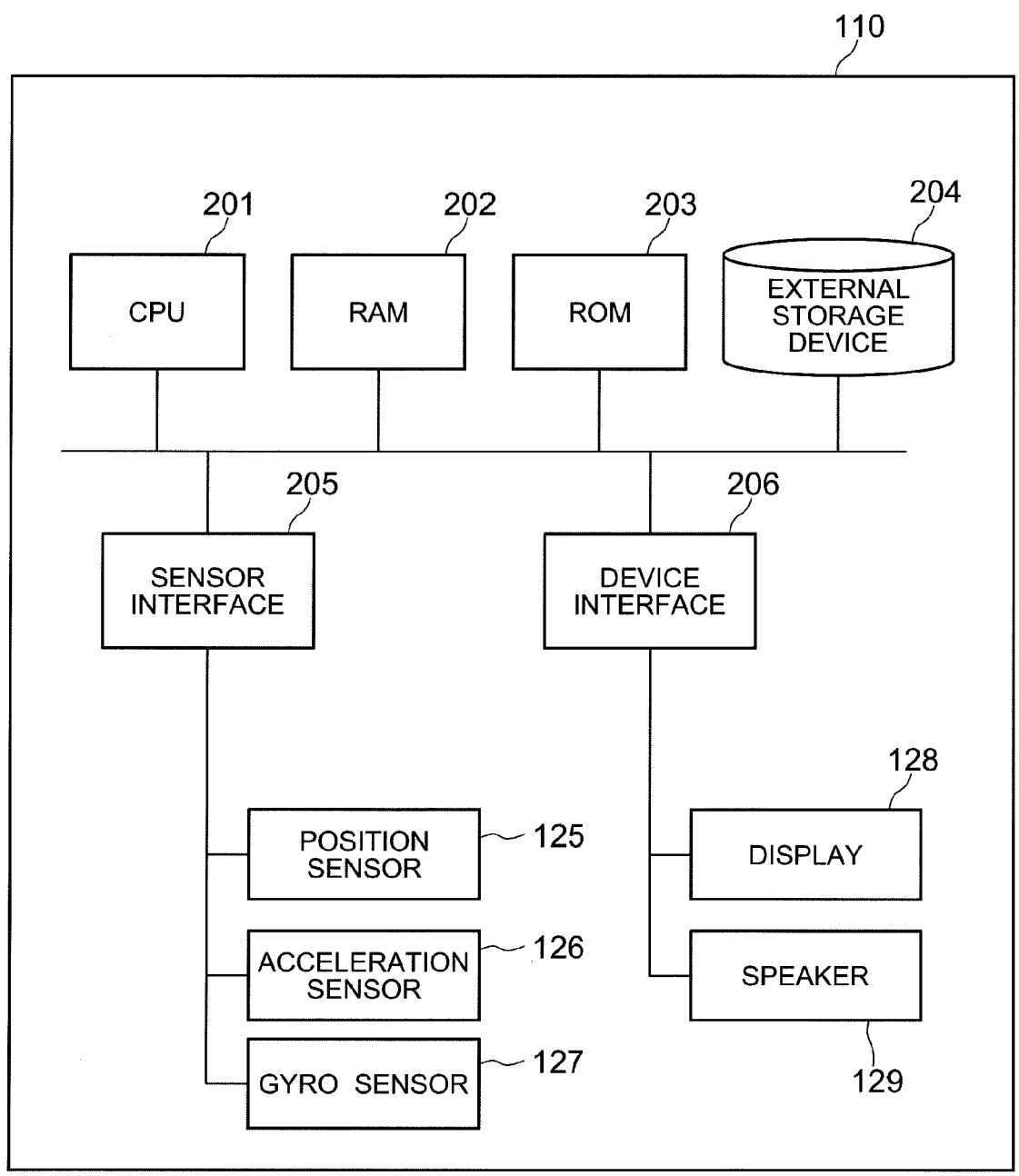
FIG. 2 is a diagram showing an example of the hardware configuration in this embodiment.

FIG. 2 is a diagram showing the hardware configuration of the information display device 110. The information display device 110 includes a CPU (processor) 201, a RAM 202, a ROM 203, an external storage device 204, a sensor interface 205, and a device interface 206. The external storage device 204 may be an HDD (hard disk drive), an SSD (flash memory drive), or an optical disc (DVD) device. The sensor interface 205 is coupled to the position sensor 125, acceleration sensor 126, and gyro sensor 127. The device interface 206 is coupled to a display 128 and a speaker 129.

The programs of the position information management unit 113, sensor information acquisition unit 114, information access control unit 115, decryption unit 116, and movement monitoring unit 118 and the data of the position information history management unit 111, map information management unit 112, encrypted information management unit 117, partial area information management unit 119, and warning information management unit 120, which are shown in FIG. 1, are stored in the external storage device 204. When the information display device 110 is powered on, these programs and data are loaded from the external storage device 204 into the RAM 202 and the programs are executed. In this case, the loader program, which loads the programs and data into the RAM 202, is stored in the ROM 203.

FIG. 3 is a diagram showing the table configuration of the route information management unit 103 in the management terminal 101. This table, provided for managing the routes the user visits, is composed of the following columns: user ID 301, date 302, order 303, origin 304, destination 305, and road link 306. The user ID 301 is information for identifying a user. The date 302 represents the date on which the user will move or moved along the route, indicating that the user moves from the place specified by the origin 304 to the place specified by the destination 305 on the date specified by the date 302. The road link 306 indicates the route from the origin 304 to the destination 305 using a road link sequence. For example, the road link 306 indicates that the user moves from P1 to P2 via the road link L11→L12→L13→ . . . . In this table, two types of routes are saved: planned route and actual route. The planned route is a route the user will visit in future, and the actual route is a route the user already visited. The date 302 of the planned route is a future data, and the date 302 of the actual route is a past date.

FIG. 4 is a diagram showing the table configuration of the customer information management unit 107 in the management terminal 101. This table, provided for managing customer information, is composed of the following columns: destination 401 and customer information file 402. The destination 401 corresponds to the destination 305 in FIG. 3. The customer information file 402 represents the location of the customer information file corresponding to the destination 401. For example, the customer information to be browsed at the destination P2 is stored in the file "C:/data/info1.data".

FIG. 5 is a diagram showing the table configuration of the position information history management unit 111 in the information display device 110. This table is composed of the following columns: date/time 501, coordinate 502, road link 503, and destination arrival flag 504. The coordinate 502, which indicates the information that identifies a position, may be the latitude/longitude or the relative coordinates with a particular point as the origin. The road link 503 indicates the ID of the road link along which the user travels at that time. For example, the first entry indicates that the user is traveling along the road link "L11" at 14:26:30 on 2011 Jul. 18 and that the coordinates at that time are "X1,Y1". The destination arrival flag 504 indicates whether or not the user has arrived at a destination at the time indicated by the date/time 501. For example, the example in the figure indicates that the user has already arrived at the destination at 14:26:30 on 2011 Jul. 18. It is determined that the user has arrived at the destination and therefore the destination arrival flag is set to "1" either when the user presses the "arrival" button displayed on the display 128 or when the customer information is decrypted successfully and the user browses the content of the customer information.

FIG. 6 is a diagram showing the table configuration of the partial area information management unit 119 in the information display device 110. This table is composed of the following columns: partial area ID 601 and partial area 602. The partial area 602 is information for identifying a partial area of an area divided into a grid. The partial area 602, which is represented by a rectangular area, is specified by the two vertices. For example, "M1" is the partial area ID of a rectangular area whose vertices on the diagonal line are "X1,Y1" and "X2,Y2".

FIG. 7 is a diagram showing the table configuration of the warning information management unit 120 in the information display device 110. This table, provided for managing information for notifying a warning to the user, is composed of the following columns: before-movement partial area ID 701 and after-movement partial area ID 702. An entry in this table indicates a warning that is issued when the user moves from the before-movement partial area ID 701 to the after-movement partial area ID 702. For example, a warning is issued when the user's position moves from "M1" to "M2". The before-movement partial area ID 701 and the after-movement partial area ID 702 correspond to the partial area ID 601 in FIG. 6, and the partial area 602 is defined in FIG. 6.

Figure 8:
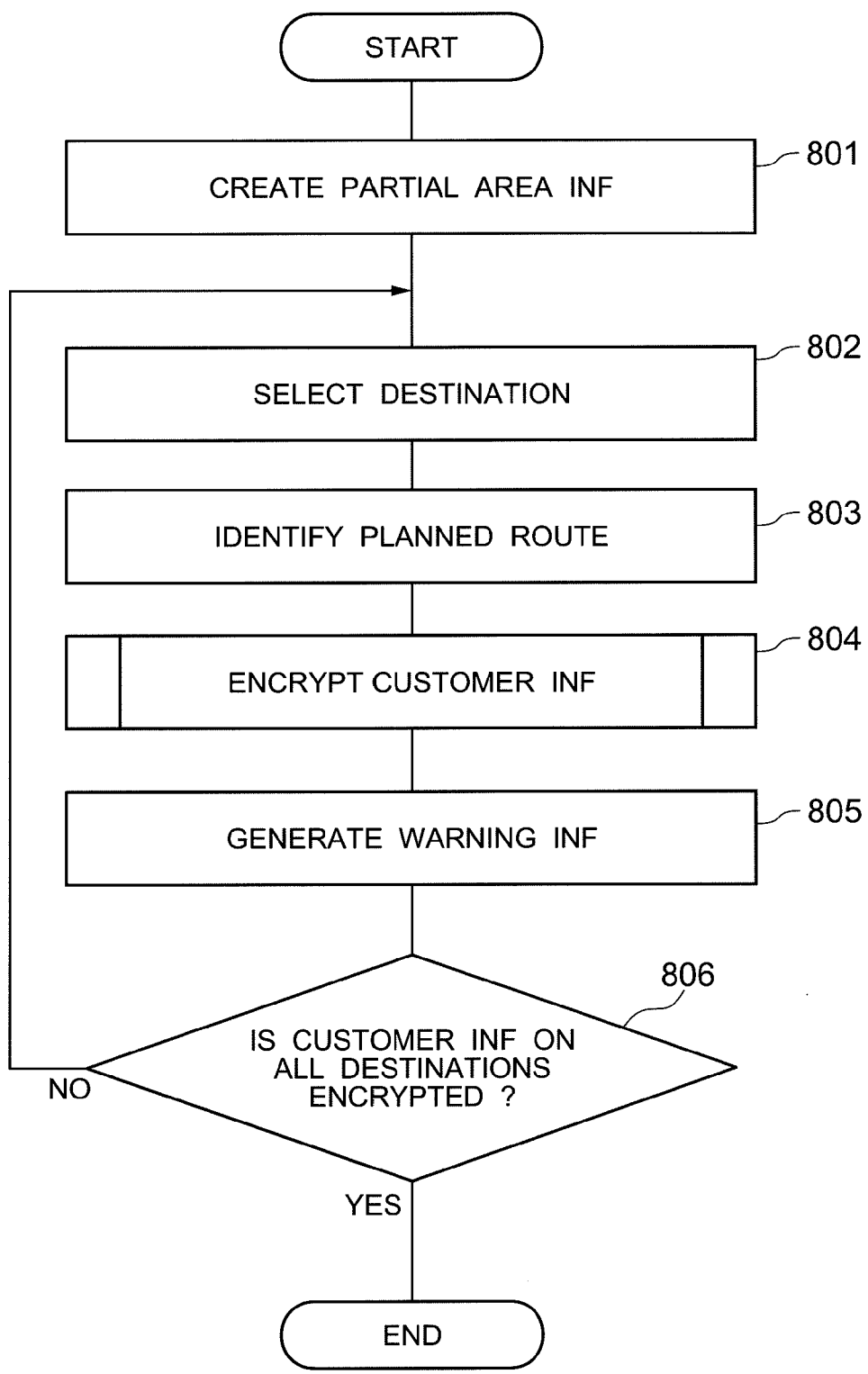
FIG. 8 is a flowchart showing an example of the take-out information creation processing in this embodiment.

FIG. 8 is a flowchart showing the take-out information creation processing performed by the take-out information creation unit 105 in the management terminal 101. The user specifies the "user ID" and the "target date/time" to create the take-out information.

In step 801, the take-out information creation unit 105 first searches the route information management unit 103 for route information using the specified user ID and the date/time as the key. The take-out information creation unit 105 searches for multiple pieces of route information, for example, the route from the origin P1 to the destination P2, the route from the origin P2 to the destination P3, and so on. If the route creation unit 102 has registered multiple routes from a origin to a destination, the take-out information creation unit 105 searches for multiple routes from the same origin to the same destination. For example, multiple routes from the origin P1 to the destination P2 are searched for. Next, the take-out information creation unit 105 acquires a list of destinations from the multiple acquired routes and determines the partial area size so that the destinations are included in different partial areas, one in each partial area. Note that a partial area is a rectangular area created by dividing an area into a grid. First, a partial area that is used as the base partial area is defined in advance. The take-out information creation unit 105 performs calculation to find a partial area to which each destination belongs and, if two or more destinations belong to the same partial area, divides the partial area into four (into two in vertical direction and into two in horizontal direction) to narrow the range of one partial area. The take-out information creation unit 105 repeatedly divides the partial areas until no multiple destinations belong to the same partial area. The size of the base partial area may be set in advance arbitrarily; instead of this, the primary geographic division (about 80 km squares), secondary geographic division (about 10 km squares), or tertiary geographic division (about 1 km squares), which is defined by Japanese Industrial Standards, may also be used.

Next, to identify the destination of the processing target, the take-out information creation unit 105 selects one route from the multiple routes searched for in step 801 (step 802) and acquires the road link 306 of the selected path. Based on the acquired road link 306 and the partial area information calculated in step 801, the take-out information creation unit 105 identifies a planned route from the origin to the destination (step 803).

Note that the planned route may be a partial-area-based planned route, a road-link-based planned route, or a destination-based planned route. The partial-area-based planned route is determined as follows. When the road link sequence of the route is L1→L2→L3→L4 and when the partial area corresponding to the road link L1 is M1, the partial area corresponding to the road link L2 is M2, the partial area corresponding to the road link L3 is M2, and the partial area corresponding to the road link L4 is M3, then the partial-area-based planned route is M1→M2→M3.

For the road-link-based planned route, the road link 306 acquired in step 801 is used directly as the planned route based on a road link. The destination-based planned route is determined as follows. When there is a route via which the user visits the destinations in the order P1→P2→P3 and when the partial area corresponding to P1 is M1, the partial area corresponding to P2 is M2, and the partial area corresponding to P3 is M3, then the destination-based planned route is M1→M2→M3. Note that the visiting route P1→P2→P3 is registered in the route information management unit 103 as two routes, P1→P2 and P2→P3. Although, for a destination-based planned route, an array of the partial areas corresponding to the coordinates of the destination is used using the destination as the base point, an array of partial areas corresponding to the destination and the intersections may also be used using not only the destination but also the intersections on the way as the base point.

As the intersections that is used, all left-turn and right-turn intersections may be selected, a part of left-turn and right-turn intersections may be selected randomly, or predetermined particular intersections may be selected. A partial-area-based planned route, a road-link-based planned route, and a destination-based planned route will be described more in detail also in FIG. 12 using an illustration example.

A planned route, from which a loop portion is deleted, is created. Because whether a loop portion is a correct route or a return route after a mistake cannot be determined, the loop portion is excluded from the target of the planned route. For example, for a planned route in which the user moves partial areas "M1→M2→M3→M2→M4", the planned route is changed to "M1→M2→M4" by deleting the loop portion "M2→M3→M2". Doing so produces two planned routes; one is the original planned route from which the loop portion is not deleted and the other is the planned route from which the loop portion is deleted. The planned route from which the loop portion is not deleted is used for the generation of warning information (step 805), and the planned route from which the loop portion is deleted is used for customer information encryption (step 804).

Next, the take-out information creation unit 105 encrypts the customer information, which will be browsed at the destination, based on the planned route which was acquired in step 803 and from which the loop portion is delete (step 804). The take-out information creation unit 105 identifies the customer information to be encrypted by searching the customer information management unit 107 using the destination, identified in step 802 as the key. The detail of the customer information encryption processing will be described later with reference to FIG. 9.

For stronger encryption, it is required that the size of the planned route, specified as the input, be equal to or longer than a predetermined size and that the size be pre-defined in advance according to the security requirement. That is, the predetermined number or more partial areas or road links must be specified as the planned route. If the number of partial areas or the number of links of the identified planned route from the origin to the destination is insufficient, one or more preceding planned routes are used to extend the route. If multiple routes are registered when using preceding planned routes, which route to use is determined according to the priority that is set at registration time.

For example, consider the example in which the customer information on P3 is encrypted. In this example, assume that the planned route P1→P2 from which the loop portion is deleted is "M1→M2→M3", that the planned route P2→P3 from which the loop portion is deleted is "M3→M4→M5", and that the number of partial areas required for encryption is "4". In this case, because there are only three partial areas in the planned route "M3→M4→M5" for P2→P3, the planned route for P2 is consolidated to create the planned route "M1→M2→M3→M4→M5". After that, the four partial areas closest to the destination are selected to create the planned route "M2→M3→M4→M5".

As described above, the information amount of a single planned route, if insufficient, is increased by using a past planned route to extend the planned route. A past planned route of different date may also be used. For example, if the information on the planned route P1→P2 on 2011 Jul. 21 is insufficient and if there is no preceding route before P1 on 2011 Jul. 22, the planned route is extended to a past planned route and the planned route P10→P1 on preceding date 2011 Jul. 21 is used.

Next, the take-out information creation unit 105 generates warning information based on the planned route which is acquired in step 803 and from which a loop portion is not deleted (step 805). The warning information is generated to alert the user to the condition in which the user has departed from the route. The generated warning information is downloaded to the information display device 110 to give a warning to the user when the user has departed from the predetermined route. A warning is issued when the user moves out of the planned route which is acquired in step 803 and from which a loop portion is not deleted.

For a partial-area-based planned route, a warning is issued if a partial area array is acquired in step 803 as the planned route from which a loop portion is not deleted and if a transition occurs to a partial area not defined in this partial area array. For example, if the partial area array is M1→M2 and the partial areas surrounding M1 (up and down, left and right) are {M2, M3, M4, M5}, warning information is generated if a transition other than the transition M1→M2 occurs (that is, transitions M1→M3, M1→M4, and M1→M5). In the warning information, a before-transition partial area is a partial area on the planned route and an after-transition partial area is a partial area out of the planned route. For a road-link-based planned route, a warning is issued if a road link sequence is acquired in step 803 as the planned route and if a transition occurs between road links not defined in this road link sequence.

For example, if the road link sequence is L1→L2 and if the end point of L1 is an intersection and a transition to {L2, L3, L4} may occur, warning information is generated if a transition other than the transition L1→L2 occurs (that is, transitions L1→L3 and L1→L4). In the warning information, a before-transition road link is a road link on the planned route and an after-transition road link is a road link out of the planned route. For a destination-based planned route, the route to the designation may be determined arbitrarily and therefore no warning information is generated.

If the encryption of customer information on multiple destinations, searched for in step 801, is completed (Yes in step 806), the processing is terminated. If there is customer information not yet encrypted (No in step 806), control is passed back to step 802.

Figure 9:
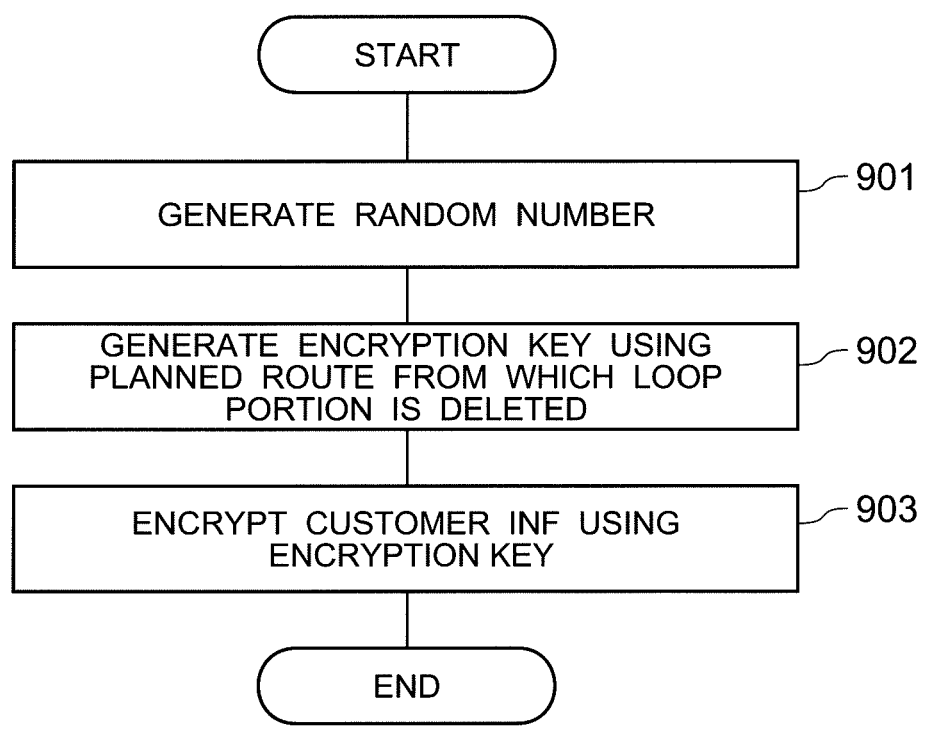
FIG. 9 is a flowchart showing an example of the customer information encryption processing in this embodiment.

FIG. 9 is a detailed flowchart showing the customer information encryption processing (step 804 in FIG. 8) performed by the take-out information creation unit 105. First, in step 901, the take-out information creation unit 105 generates a random number used for encryption key generation. For the encryption, the common key encryption algorithm is used in which the same key is used for the encryption key and the decryption key. Therefore, the random number generation method is used that generates the same random number for decryption key generation.

Although a fixed value may be used as the initial value for random number generation, using the same initial value leads to the generation of a fixed random number, meaning that the initial value should be varied for stronger security. To vary the initial value, a specific rule may be used or the initial value may be generated based on the movement date.

Next, the take-out information creation unit 105 generates an encryption key using the planned route, which is acquired in step 803 in FIG. 8 and from which a loop portion is deleted, and the random number generated in step 901 (step 902). A known generation algorithm is used for generating the encryption key.

As an example of encryption key generation, the following describes a simple example in which bit shifting is used. The character string "M1M2M3M4", which is the concatenation of the character strings of partial area IDs, is generated from the partial-area-based planned route (M1→M2→M3→M4). The character string "M1M2M3M4" is converted to a binary number and the bits are shifted to the left by the number of the random number generated in step 901. If the value of the binary number generated by converting the character string "M1M2M3M4" is "11001010" and the random number is 2, the value is shifted to the left by two bits and the encryption key "00101011" is generated as the encryption key. A method other than the bit-shift method may also be used for encryption key generation.

Next, the take-out information creation unit 105 encrypts the customer information, which will be browsed at the destination M4, using the encryption key generated in step 902, (step 903). A known encryption method, such as the XOR encryption, may be used for the encryption. As an example, the following shows a specific example in which the XOR encryption is used. When the value generated by converting the customer information to a binary number is "1010111001010001" and the encryption key generated in step 902 is "00101011", the two values are XORed. The result of the XOR operation between the high-order 8 bits of the customer information and the encryption key is "10000101", and the result of the XOR operation between the low-order 8 bits of the customer information and the encryption key is "01111010". As a result, the encrypted customer information is "1000010101111010".

Figure 10:
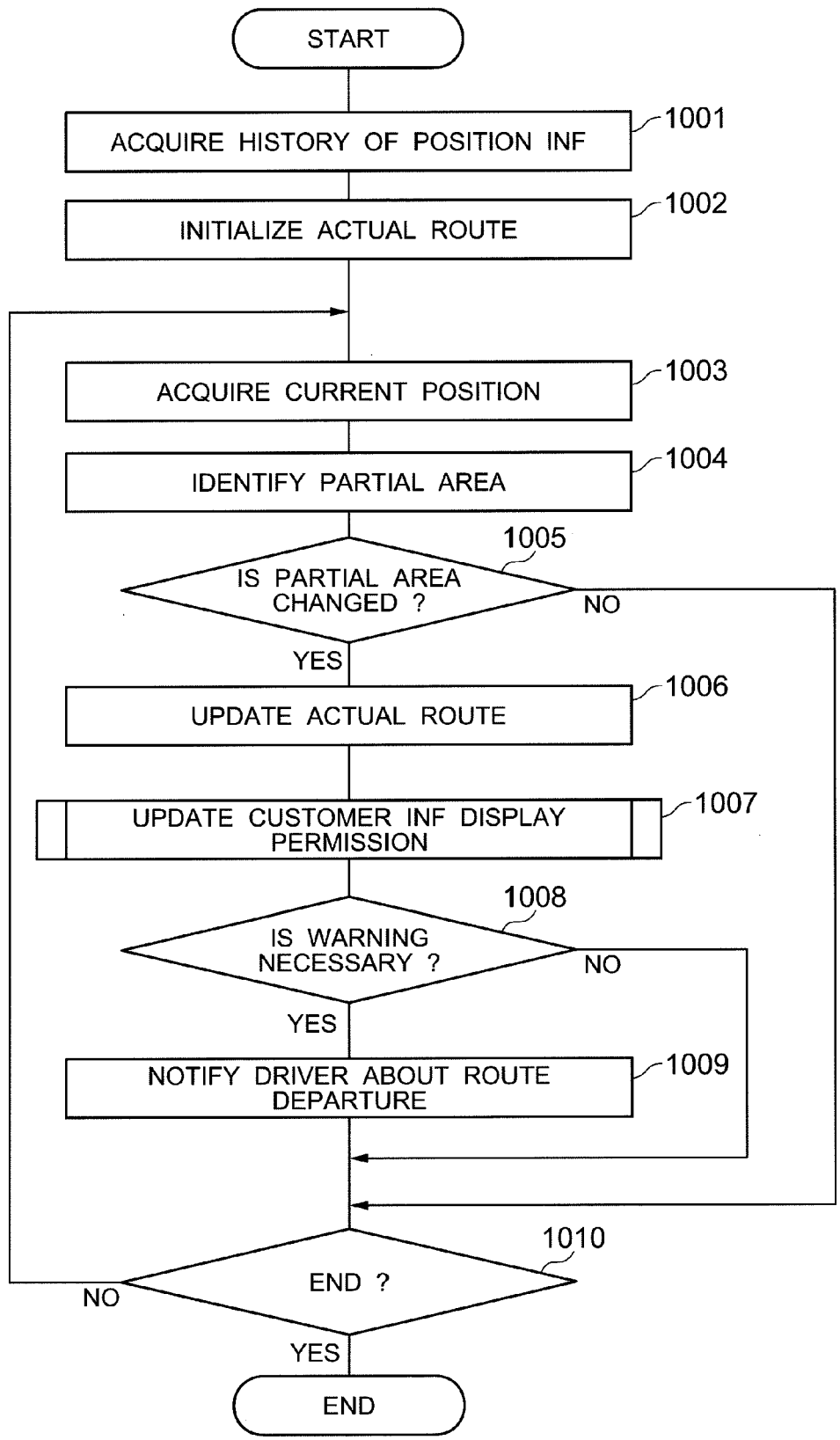
FIG. 10 is a flowchart showing an example of the information display processing in this embodiment.

FIG. 10 is a flowchart showing the information display processing performed by the information display device 110. First, the information access control unit 115 acquires the history of the position information from the position information history management unit 111 via the position information management unit 113 (step 1001). Step 1001 is triggered when the user presses the button, when the pre-set time is reached, or when the information display device 110 is powered on.

Next, the information access control unit 115 initializes the actual route based on the position information history acquired in step 1001 (step 1002). First, the information access control unit 115 calculates the road link sequences on a time-series basis from the position information history acquired in step 1001. Next, the information access control unit 115 acquires the partial area information from the partial area information management unit 119 via the movement monitoring unit 118. After that, the information access control unit 115 calculates the partial-area-based actual route from the calculated road link sequence and the partial area information and initializes the calculated actual route. When the road-link-based actual route is used, the information access control unit 115 uses the road link sequence, acquired from the position information history, for the initialization. When the destination-based actual route is used, the information access control unit 115 acquires the data, whose destination arrival flag 504 is "1", from the position information history management unit 111 as the position information history. Next, from the acquired position information history and the partial area information, the information access control unit 115 calculates the partial area array, corresponding to the destination, as the actual route.

The information access control unit 115 regularly executes steps 1003 to 1010 at intervals of a predetermined time. First, the information access control unit 115 transmits a current position acquisition request to the position information management unit 113. The position information management unit 113 acquires the sensor information from the position sensor 125, acceleration sensor 126, and gyro sensor 127 periodically (for example, every second) via the sensor information acquisition unit 114. The information access control unit 115 identifies the current position on the map based on the acquired sensor information and the map information managed by the map information management unit 112.

A known method may be used to identify the current position on the map (called mapping). The position information management unit 113 saves the identified position information and the road links in the position information history management unit 111. The position information management unit 113 returns the identified current position and the road links in response to the request from the information access control unit 115.

In step 1004, the information access control unit 115 transmits an inquiry to the movement monitoring unit 118 to identify the partial area corresponding to the current position of the information display device 110. When road links are used as the actual route, no processing is performed in step 1004 because the road link is already identified in step 1003.

In step 1005, the information access control unit 115 determines if the identified partial area/road link is changed. The movement monitoring unit 118, which memorizes the previous partial area/road link, compares the previous partial area/road link with the partial area/road link identified from the current position to determine if the partial area/road link is changed. If the partial area/road link is changed (Yes in step 1005), control is passed to step 1006. If the partial area/road link is not changed (No in step 1005), control is passed to step 1010.

If the movement monitoring unit 118 determines that the information display device 110 has moved and the partial area, to which the information display device 110 belongs, is changed, the information access control unit 115 updates the actual route (step 1006). For example, if the actual route is "M1→M2→M3" and the partial area is changed from M3 to M4, the information access control unit 115 updates the actual route to "M1→M2→M3→M4". Next, the information access control unit 115 updates the customer information display permission (step 1007), makes the browsable customer information non-browsable, or makes non-browsable customer information browsable. The update processing of customer information display permission will be described later in detail with reference to FIG. 11.

Next, if it is determined in step 1005 that the partial area is changed, the information access control unit 115 checks if a warning to the user is necessary (step 1008). The movement monitoring unit 118 searches the warning information management unit 120 using the IDs, associated with the partial area change (before-movement partial area ID and the after-movement partial area ID) as the key. If the corresponding record is searched for, the warning is necessary; conversely, if the corresponding record is not searched for, the warning is not necessary. For example, if the partial area is changed from M1 to M2 in step 1005, the movement monitoring unit 118 searches for a record whose before-movement partial area ID 701 is M1 and the after-movement partial area ID 702 is M2. If the warning is necessary, the movement monitoring unit 118 transmits a warning notification request to the information access control unit 115.

In step 1009, a route departure warning is notified to the user. If it is determined in step 1008 that the warning is necessary, the information access control unit 115 displays the warning screen on the display 128 and outputs the warning sound or warning voice message from the speaker 129. The warning may be issued only once, may be continued for a predetermined time, or may be continuously issued until the user returns to the original route.

The warning screen and the warning sound/warning voice message may be notified synchronously, the screen and the sound may be notified for different lengths of time, the screen and the sound may be notified at different times, or one of them may be notified. When the user has mistakenly departed from the route, the warning notifies the user that the user has departed from the route to allow him or her to return to the original route.

The number of warning notifications is stored and, if the number of warning notifications exceeds the predetermined upper limit, all the encrypted customer information is deleted. Doing so protects the customer information even if a third party acquires the information display device 110 fraudulently and moves along the routes on a trial and error basis.

In step 1010, the information access control unit 115 determines if the processing is to be terminated. If the processing is not yet terminated (No in step 1010), control is passed back to step 1003. The determination to terminate the processing may be triggered when the user presses the button or when the information display device 110 is powered off.

Figure 11:
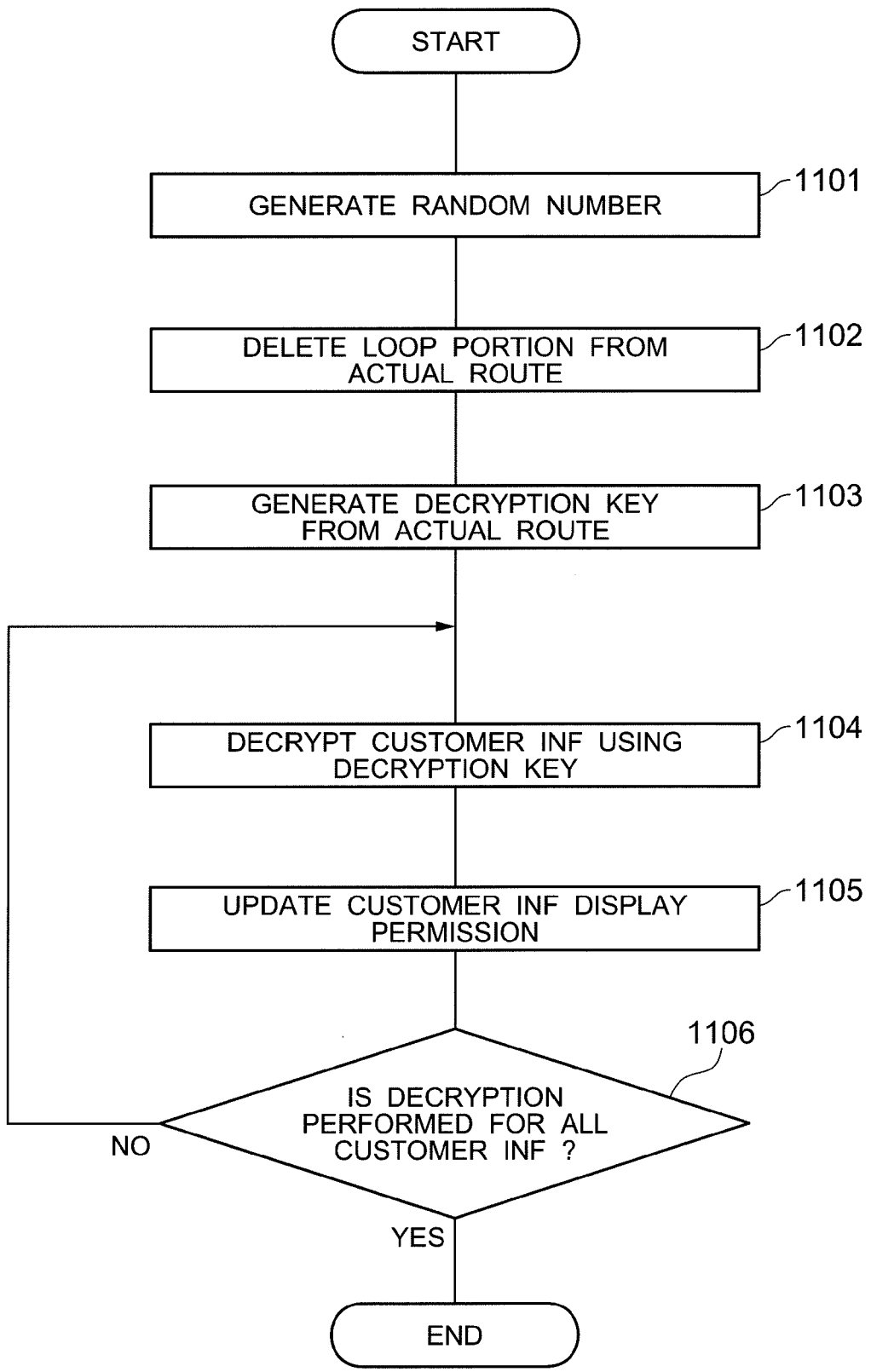
FIG. 11 is a flowchart showing an example of the update processing for customer information display permission in this embodiment.

FIG. 11 is a detailed flowchart showing the update processing for customer information display permission (step 1007 in FIG. 10) performed by the information access control unit 115. First, the decryption unit 116 generates a random number, which is used for generating the decryption key, in response to a request from the information access control unit 115 (step 1101). The initial value of the random number is the same as the initial value used in step 901 in FIG. 9.

Next, the decryption unit 116 acquires the actual route, which is used as the input information for decryption key generation, from the information access control unit 115 and deletes a loop portion from the actual route (step 1102). Assume that the originally-scheduled planned route is "M1→M2→M3" but that the user mistakenly departed from the route and the actual route becomes "M1→M2→M4→M2→M3". When the user mistakenly takes a wrong route and then returns to the original route, a part of the actual route becomes a loop. In the example given above, the part "M2→M4→M2" is a loop. This loop portion, which is not an originally-scheduled planned route, is deleted, and the "M1→M2→M4→M2→M3" is corrected to "M1→M2→M3".

Because all the actual routes, including those of yesterday and days before, can be acquired in step 1102, the actual route long enough for decryption key generation is selected from the acquired actual route. For example, when the actual route acquired in step 1102 is "M1→M2→M3→M4→M5→M6→M7" and the length of the actual route required for decryption key generation is 3, the three "M5→M6→M7" closest to the current position are selected for decryption key generation.

The decryption key is generated using the actual route selected as described above and the random number generated in step 1101 (step 1103). The initial value, the random number generation method, and the decryption key generation algorithm, which are used for generating the decryption key, are the same as the initial value (or the generation method), the random number generation method, and the key generation algorithm used for encryption key generation in step 902 in FIG. 9.

In step 1104, the customer information is decrypted using the decryption key generated in step 1103. Because it is not determined to which destination the user is traveling, the decryption processing is performed for all the encrypted customer information managed by the encrypted information management unit 117. In decrypting the customer information, the algorithm corresponding to the encryption algorithm is used.

In step 1105, the customer information access permission (display permission in this case) is updated based on whether or not the customer information is decrypted successfully, and the result is notified to the user. The method for notifying the result to the user will be described in detail later with reference to FIG. 13.

One method for determining if the decryption was successfully done is that the character string, such as "OK", is written in a predetermined position of the customer information and, after the decryption, a check is made if the character string "OK" can be read from the decrypted information to see if the decryption was successful. Another method is that, instead of directly writing the character string in the customer information, a confirmation file in which only "OK" is written is prepared and the confirmation file is decrypted in the same way as the customer information. The confirmation file is decrypted, and a check is made if the character string "OK" is can be read to see if the decryption was successful.

In this case, a confirmation file is required for each piece of customer information. For example, if there are two pieces of customer information named "info1.data" and "info2.data", the confirmation files "info1.ok" and "info2.ok" corresponding to the customer information are created. "info1.data" and "info1.ok" are encrypted using encryption key 1, and "info2.data" and "info2.ok" are encrypted using encryption key 2.

In step 1106, the information access control unit 115 determines if decryption is performed for all customer information managed by the encrypted information management unit 117. If decryption is performed for all customer information (Yes in step 1106), the processing is terminated. If there is customer information for which decryption is not yet performed (No in step 1106), control is passed back to step 1104.

Figure 12:
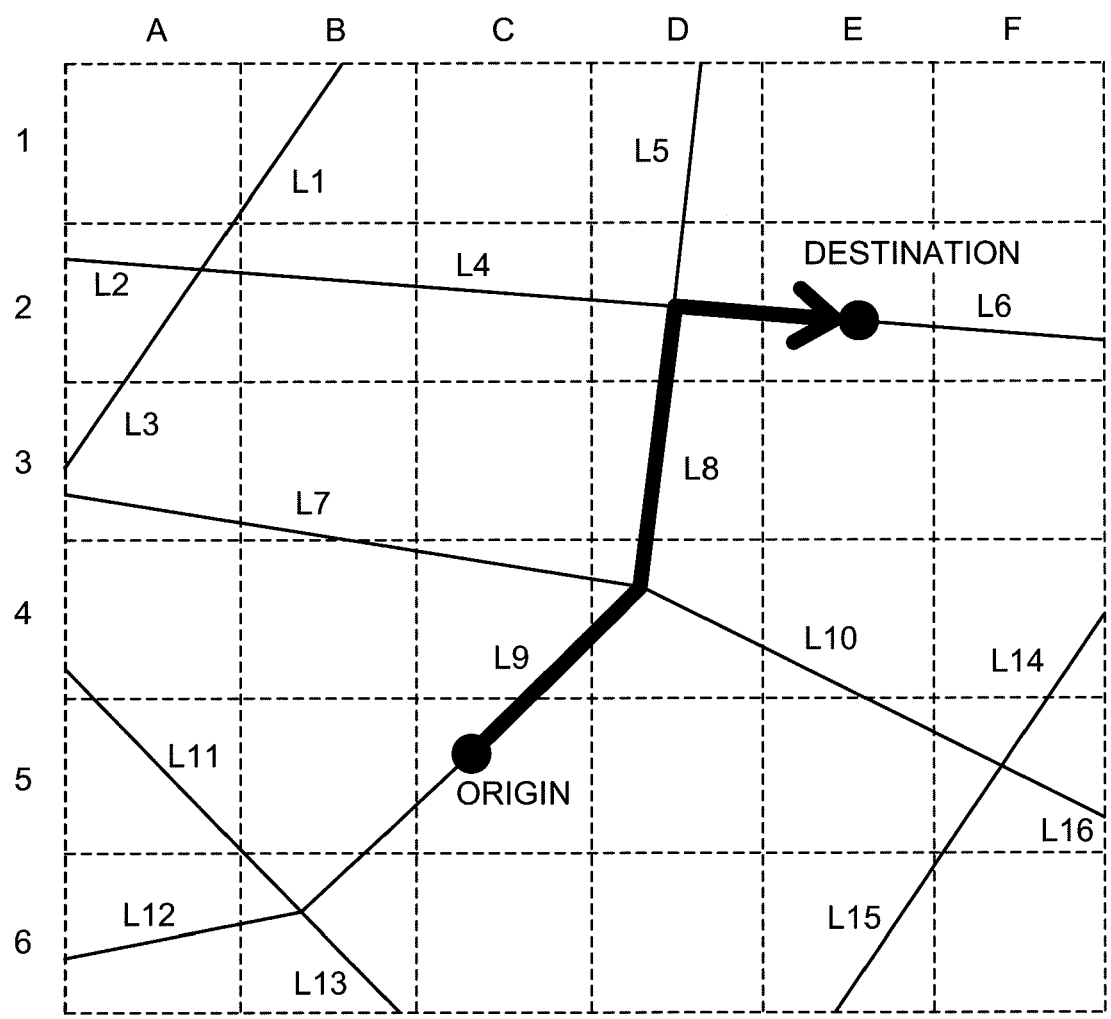
FIG. 12 is a diagram showing an example of the image of a planned route in this embodiment.

FIG. 12 is a diagram showing the image of a planned route. The route from the origin to the destination, written in bold, indicates the route along which the user will travel. The solid line indicates a road, and the dotted line indicates the boundary of a partial area in the grid-like area. In the example in the figure, the area is divided into 36 partial areas arranged vertically and horizontally. The top-left partial area is called "A1", while the bottom-right partial area is called "F6". L1 to L6 indicate the road link IDs each corresponding to a road link from one intersection to the next.

The route, along which the user will travel, is represented by the partial-area-based planned route as "C5→C4→D4→D3→D2→E2". The route is represented by the road-link-based planned route as "L9→L8→L6". The route is represented by the destination-based planned route as "C5→E2".

Figure 13:
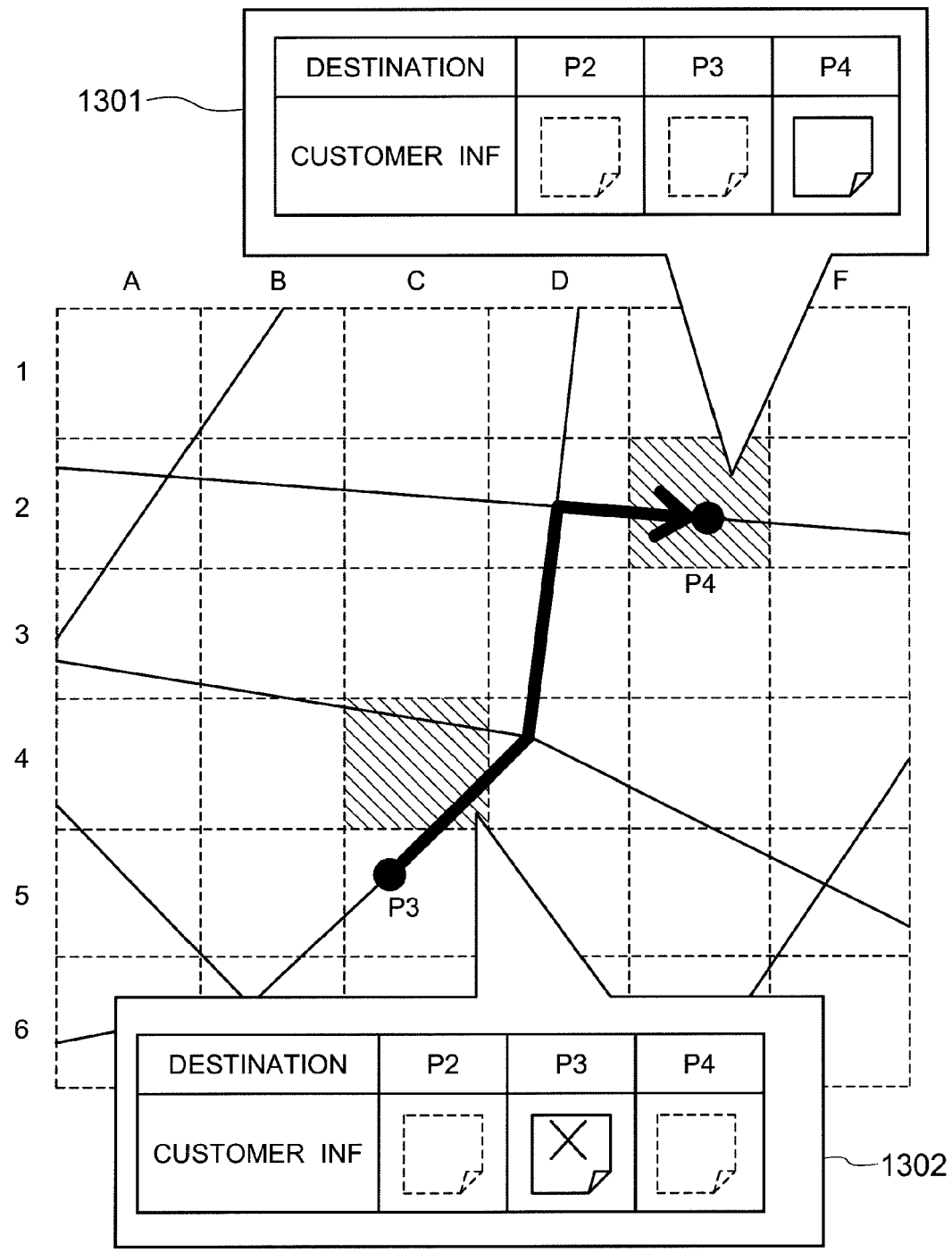
FIG. 13 is a diagram showing an example of the image of the notification screen that notifies the customer information display permission in this embodiment.

FIG. 13 is a diagram showing the image of the notification screen that notifies the customer information display permission. The route, along which the user will travel, is the route from the origin P3 to the destination P4 as in FIG. 12. The figure shows an example in which a partial-area-based planned route is used for determination.

A screen 1301 shows the screen when the user enters the partial area "E2" corresponding to the destination P4. The screen displays the destination as well as the customer information file icons corresponding to the destination. The user can press a customer information file icon to browse the content of the customer information. This example shows that the user can browse the content by pressing a solid-line customer information file icon (active state) but cannot browse the content even if the user presses a dotted-line file icon (inactive state).

Whether or not the user can browse the content may be indicated not only by using the solid line (active) and dotted line (inactive) but also by changing the colors of icons or the sizes of icons. When the partial area of the current position changes from D2 to E2, the customer information files corresponding to P4, which have been non-browsable, become browsable. The customer information files corresponding to the destinations other than P4 become non-browsable.

A screen 1302 shows the screen when the user leaves the origin P3 and the partial area of the current position changes from C5 to C4. The screen shows that the customer information, which has been browsable at P3, becomes non-browsable. There are several methods for notifying the user that the customer information becomes non-browsable: the x symbol is displayed on the customer information file to explicitly notify the user about the state, the customer information file is put in the inactive state (state in which the customer information file cannot be browsed even when the icon is pressed) so that the user cannot browse the customer information, the warning sound is output, the screen is erased, or the screen is flashed.

Figure 14:
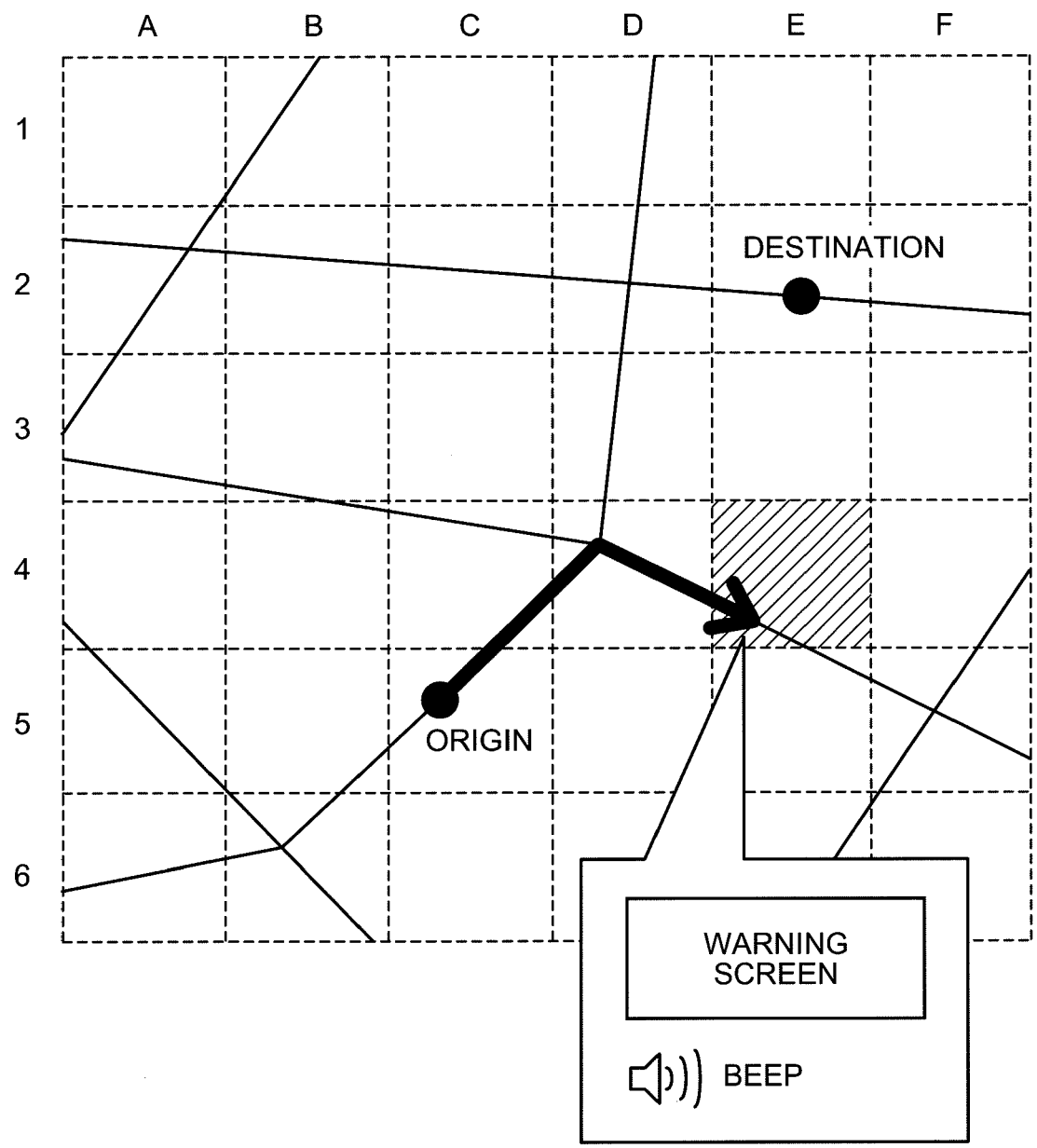
FIG. 14 is a diagram showing an example of the image of a warning notification in this embodiment.

FIG. 14 is a diagram showing the image of a warning notification that is issued when the user departs from the route. The figure shows an example in which the route, along which the user will travel, is the route from the origin P3 to the destination P4 as in FIG. 12 and a partial-area-based planned route is used for determination. This example describes a case in which the user mistakenly turned right at the intersection in the partial area D4. Because the user originally intended to travel along the planned route "C5→C4→D4→D3→D2→E2", the warning screen or the warning sound/warning voice message is used to notify the user that the user took a wrong route and mistakenly turned right when the partial area changed from D4 to E4.

The specification and drawings are, accordingly, to be regarded in an illustrative rather than a restrictive sense. It will, however, be evident that various modifications and changes may be made thereto without departing from the spirit and scope of the invention(s) as set forth in the claims.

We claim:

1. An access control method for accessing information at a place, to which a user will move, using a portable information display device, the access control method comprising the steps of:
   identifying identifiers of planned waypoints during a move to a destination and an identifier of the destination, the destination being a place where the information will be accessed;
   creating a planned route of the information display device, the planned route represented as a sequence of the identifiers of the planned waypoints and the identifier of the destination;
   generating an encryption key based on the created planned route;
   encrypting the information, which will be accessed, using the generated encryption key;
   repeatedly acquiring position information on the information display device during the move;
   identifying an actual route of the information display device by identifying identifiers of waypoints and an identifier of a current position based on the acquired position information;
   generating a decryption key based on the identified actual route; and
   decrypting the encrypted information using the generated decryption key and, if the decryption is successful, permitting the information display device to access the information within an area corresponding to the destination;
   wherein the planned route is created in such a way that the identifiers, which constitute the planned route, are different and
   wherein if duplicated identifiers are included in the actual route, an identifier between the duplicated identifiers and one of the duplicated identifiers are deleted from the sequence of the identifiers.

2. The access control method according to claim 1, further comprising the steps of:

creating a plurality of the planned routes with the same place and/or a plurality of different places as the destination;

generating a plurality of different encryption keys, one for each of the plurality of the planned routes;

generating a plurality of pieces of different encrypted information using the plurality of the generated encryption keys; and decrypting the plurality pieces of the encrypted information using one of the generated decryption keys.

3. An access control method for accessing information at a place, to which a user will move, using a portable information display device, the access control method comprising the steps of:

identifying identifiers of planned waypoints during a move to a destination and an identifier of the destination, the destination being a place where the information will be accessed;

creating a planned route of the information display device, the planned route represented as a sequence of the identifiers of the planned waypoints and the identifier of the destination;

generating an encryption key based on the created planned route;

encrypting the information, which will be accessed, using the generated encryption key;

repeatedly acquiring position information on the information display device during the move;

identifying an actual route of the information display device by identifying identifiers of waypoints and an identifier of a current position based on the acquired position information;

generating a decryption key based on the identified actual route;

decrypting the encrypted information using the generated decryption key and, if the decryption is successful, permitting the information display device to access the information within an area corresponding to the destination;

generating the encryption key using planned routes of yesterday and days before if the encryption key cannot be generated using the created planned route; and generating the decryption key using an actual route, which is long enough for generating the decryption key, from the actual route of yesterday and days before.

4. An access control method for accessing information at a place, to which a user will move, using a portable information display device, the access control method comprising the steps of:

identifying identifiers of planned waypoints during a move to a destination and an identifier of the destination, the destination being a place where the information will be accessed;

creating a planned route of the information display device, the planned route represented as a sequence of the identifiers of the planned waypoints and the identifier of the destination;

generating an encryption key based on the created planned route;

encrypting the information, which will be accessed, using the generated encryption key;

repeatedly acquiring position information on the information display device during the move;

identifying an actual route of the information display device by identifying identifiers of waypoints and an identifier of a current position based on the acquired position information;

generating a decryption key based on the identified actual route; and decrypting the encrypted information using the generated decryption key and, if the decryption is successful, permitting the information display device to access the information within an area corresponding to the destination;

wherein each of the identifiers of the planned waypoint, destination, waypoint, and current position identifies a partial area generated by dividing an area according to the same criterion;

if there are a plurality of destinations, determining a size of the partial area so that the identifiers of the destinations become different; and determining the identifiers of the waypoint and the identifier of the current position, which represent the actual route, based on the determined size.

5. The access control method according to claim 4, further comprising the step of:

as a result of the decryption, notifying a user of the information display device whether or not the user is permitted to access the information.

6. The access control method according to claim 4, wherein the information is stored in a management terminal, the identifiers identifying step, the planned route creating step, the encryption key generating step, and the information encrypting step are performed by the management terminal, and the position information acquiring step, the actual route identifying step, and the decryption key generating step, and the encrypted information decrypting step are performed by the portable information display device.

* * * * *